H. R. FRANCIS.
FRUIT GRADING MACHINE.
APPLICATION FILED MAR. 6, 1913.
1,139,510.
Patented May 18, 1915.
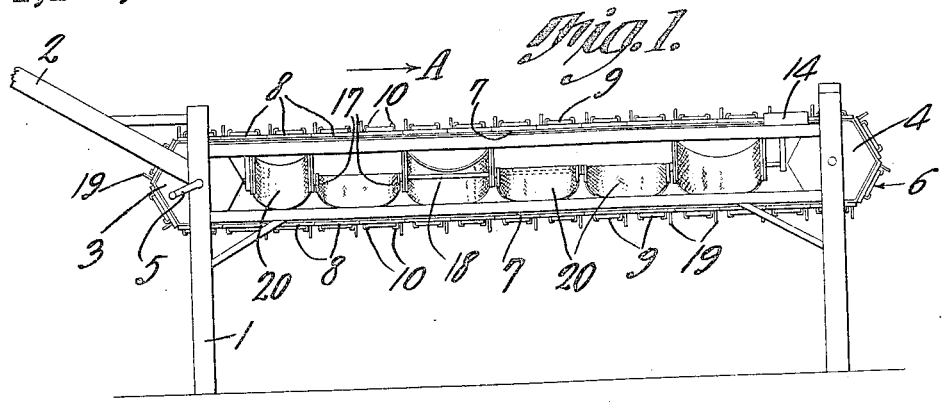
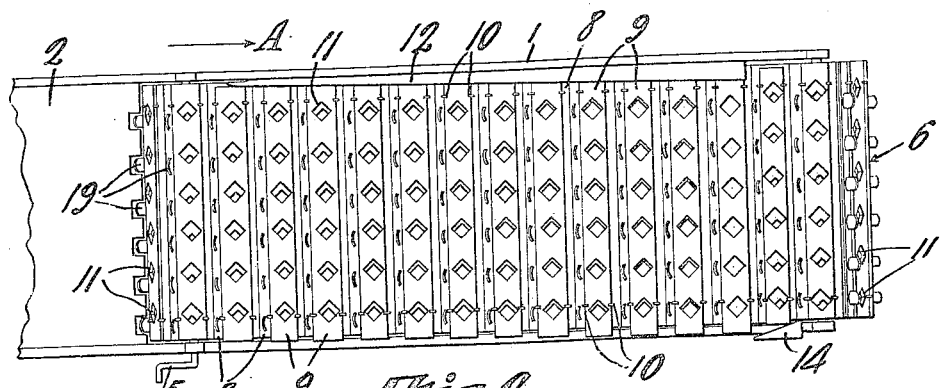
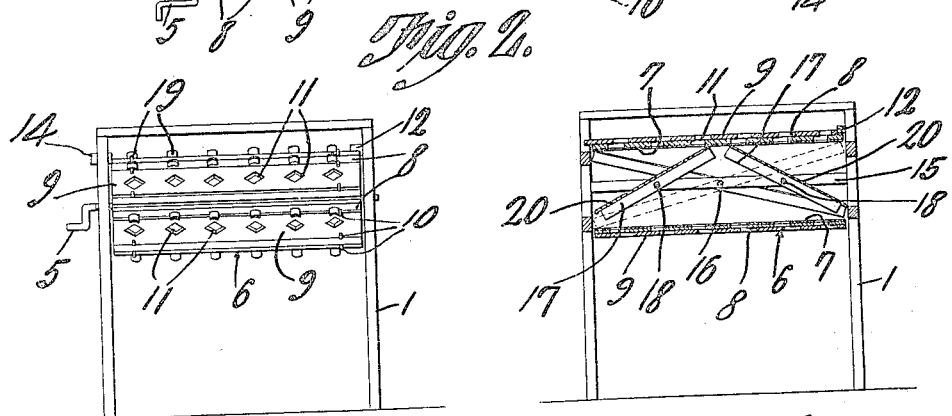
Witnesses
Hugh R. Francis, Inventor
by Attorneys

UNITED STATES PATENT OFFICE.

HUGH R. FRANCIS, OF GRAND JUNCTION, COLORADO.

FRUIT-GRADING MACHINE.

1,139,510.  Specification of Letters Patent.  Patented May 18, 1915.

Application filed March 6, 1913. Serial No. 752,352.

*To all whom it may concern:*

Be it known that I, HUGH R. FRANCIS, a citizen of the United States, residing at Grand Junction, in the county of Mesa and State of Colorado, have invented a new and useful Fruit-Grading Machine, of which the following is a specification.

The device forming the subject matter of this application is a fruit grading machine and the invention aims to provide a device of this type in which the grading operation is effected by the relative movement of coöperating members which constitute a conveyer, novel means being provided for producing relative movement between the movable parts of the conveyer and said parts having openings which are brought progressively into alinement, thereby to effect the grading operation.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows in side elevation, a fruit grader embodying the present invention; Fig. 2 is a top plan of the structure shown in Fig. 1; Fig. 3 is an end elevation of the structure shown in Fig. 1; Fig. 4 is a transverse section.

In carrying out the present invention there is provided a supporting frame 1 which may be of any desired form, the frame 1 at one end being equipped with a chute 2 which receives initially the unsorted fruit. Journaled in one end of the frame 1 is a roller 3, a roller 4 being journaled in the other end of the frame. The roller 3 is actuated by a crank 5 or in any other suitable manner. The rollers 3 and 4 are of polygonal cross section, so as to accommodate a slat conveyer, indicated generally by the numeral 6.

The conveyer 6 which is trained around the rollers 3 and 4 comprises a body which may consist of a canvas belt 7 and slats 8 secured to the belt 7; although, if desired, the slats 8 may be pivotally connected with each other in any desired manner. Gates 9 are mounted to slide on the slats 8, longitudinally of the slats and transversely of the direction of advance of the conveyer 6, the gates 9 being held upon the slats 8 for sliding movement by means of hook shaped fingers 10 inserted into the slats 8 and overhanging the gates 9. The slats 8 and the gates 9 are equipped with coöperating openings 11.

The invention includes a primary actuating member, preferably taking the form of a long, tapered wedge 12, secured to one side of the frame 1.

The invention further includes a secondary actuating member the same being depicted in the form of a short and somewhat abrupt wedge 14, secured to the frame 1 adjacent one end of the frame and upon the opposite side of the frame from the primary actuating member 12.

The slats 8 may be provided with fruit selecting fingers 19, adapted to coöperate with the chute 2 as will be understood readily from Fig. 2.

The operation of the structure as thus far described is as follows:—When the roller 3 is actuated by the crank 5 or its equivalent, the upper run of the conveyer will move in the direction of the arrow A. As the conveyer traverses the roller 3, the fingers 19 will select fruit from the chute 2 and deposit the same upon the gates 9 in or near the openings 11. When any one slat 8 and the corresponding gate 9 are near to the chute 2, the openings 11 in the gate and in the slat will be out of alinement, as will be understood when the left hand end of Fig. 2 is examined. Therefore, only the small fruit can pass through the openings 11. As the upper run of the conveyer moves in the direction of the arrow A, the ends of the gates 9 will engage with the inclined edge of the primary actuating member 12, thus pushing the gates 9 transversely of the conveyer, the openings 11 in the slats and in the gates being moved progressively and gradually into alinement, as the upper run of the conveyer travels in the direction of the arrow A. By the time that any one slat 8 and its corresponding gate 9 has arrived at a point adjacent the right hand end of the frame, reference being had to Fig. 2, the gate 9 will have been moved by the action of the member 12 to such an extent that the openings 11 in the gate and in the slat which supports the gate will be in approximate alinement.

From the foregoing, and noting particularly Fig. 2 it will be seen that fruit of the smallest diameter will drop through the conveyer 6 first, and, progressively, fruit of increasing diameters will drop therethrough.

In order to restore the gates 9 to their original positions, the gates, as they arrive at the right hand end of the machine, are engaged by the secondary actuating member 14 and are pushed transversely of the machine into their original positions.

I am aware of the fact that, considered generally, no specific form of bin or receiving device for the sorted fruit can be claimed in the same application with a sorting or grading machine. However, in the present instance, I have shown one form of device for receiving the sorted fruit, which will be found satisfactory in operation.

A rod 16 may extend longitudinally of the frame 1 and be supported thereby. Upon this rod 16 are fulcrumed, intermediate their ends main supporting bars 15. To the supporting bars 15 are pivoted auxiliary supporting bars 17, the pivotal connections between the bars 15 and 17 being indicated at 18. Strips of canvas or the like are tacked or otherwise secured to the auxiliary supporting bars 17, to form discharge troughs 20.

Referring particularly to Fig. 4 it will be understood that the auxiliary supporting bars 17 may be brought into alinement with the main supporting bars 15 and then the supporting bars 15 may be tilted on the rod 16, so as to discharge the fruit on one side of the machine or the other, as the operator may desire, all of the fruit, in this instance being carried in one direction or the other. However, if desired, the main supporting bars 15 may remain approximately horizontal, the auxiliary supporting bars 17 being tilted upon their fulcrums 18, so that they stand at an obtuse angle to each other, as indicated in Fig. 4. Then, the fruit deposited upon any one trough 20 will be divided and passed partly to one side of the machine and partly to the other.

I claim—

1. In a fruit grader, relatively movable superimposed transverse plates having cooperating apertures intermediate the ends thereof forming grading openings; a means for producing relative movement between said plates in one direction to dispose the apertures in the respective plates progressively into coincidence thereby to increase gradually the size of the grading openings; and means for producing relative movement between said plates in another direction thereby to dispose the apertures in the respective plates out of coincidence and to decrease the size of said grading openings.

2. In a fruit grader, spaced supports; a belt conveyer extended around the supports and including a body and a gate movable upon the body, the body and the gate having coöperating apertures forming a fruit grading opening; a primary actuating member disposed at an angle to the line of advance of the upper run of the belt conveyer and engaging one end of the gate to dispose the apertures progressively in coincidence thereby to increase gradually the size of the grading opening; and a secondary actuating member disposed at an angle to the line of advance of the upper run of the conveyer and engaging the other end of the gate thereby to dispose the apertures out of coincidence and to decrease gradually the size of said grading opening.

3. In a fruit grader, spaced supports; a belt conveyer extended around the supports and including a body and a gate movable upon the body; the body and the gate having coöperating apertures forming fruit grading openings; a fruit supplying means discharging against one end of the conveyer below the upper run of the conveyer; fruit selecting fingers on the gate and coöperating with the fruit supplying means, each finger being individual to one opening and being operative while the fruit is being discharged against the conveyer and below the upper run of the conveyer by the fruit supplying means; gate engaging means for disposing the apertures progressively in alinement; and gate engaging means for disposing the apertures out of alinement.

In testimony that I claim the foregoing as my own, I have hereto affixed my signature in the presence of two witnesses.

HUGH R. FRANCIS.

Witnesses:
C. W. SMITH,
P. A. WELLS.

Copies of this patent may be obtained for five cents each, by addressing the "Commissioner of Patents Washington, D. C."